United States Patent [19]
Huguet

[11] Patent Number: 6,097,002
[45] Date of Patent: Aug. 1, 2000

[54] DEVICE FOR HEATING PLASTICS SECTIONS

[75] Inventor: Pierre Huguet, Evreux, France

[73] Assignee: Technoplast Kunststofftechnik GmbH, Micheldorf, Austria

[21] Appl. No.: 09/125,975

[22] PCT Filed: Apr. 30, 1997

[86] PCT No.: PCT/AT97/00084

§ 371 Date: Aug. 28, 1998

§ 102(e) Date: Aug. 28, 1998

[87] PCT Pub. No.: WO97/42014

PCT Pub. Date: Nov. 13, 1997

[30] Foreign Application Priority Data

Apr. 3, 1996 [FR] France ................................. 96 05757

[51] Int. Cl.[7] .............................. A21B 27/06; A21B 1/00; F27D 5/00
[52] U.S. Cl. .................................. 219/400; 432/5; 126/21
[58] Field of Search ..................................... 219/385, 400, 219/411, 392, 388, 389, 492, 491; 99/443, 348, 468, 486, 447; 126/21, 21 A; 432/5, 384, 88; 34/507, 500; 65/281

[56] References Cited

U.S. PATENT DOCUMENTS

| | | | |
|---|---|---|---|
| 3,184,796 | 5/1965 | Southcott et al. ........................... | 18/19 |
| 3,466,020 | 9/1969 | Blinne . | |
| 3,554,506 | 1/1971 | Seefluth ...................................... | 263/7 |
| 3,706,824 | 12/1972 | Huber et al. . | |
| 3,884,213 | 5/1975 | Smith ................................... | 126/21 A |
| 4,154,861 | 5/1979 | Smith ...................................... | 426/466 |
| 4,233,495 | 11/1980 | Scoville .................................... | 219/386 |
| 4,350,874 | 9/1982 | Nishikawa ................................ | 219/400 |
| 4,352,659 | 10/1982 | Salmela et al. ........................... | 432/10 |
| 5,491,996 | 2/1996 | Barrman et al. .......................... | 72/128 |
| 5,829,341 | 11/1998 | Lin ............................................ | 99/326 |
| 5,899,001 | 5/1999 | Layton ....................................... | 34/77 |
| 5,910,264 | 6/1999 | Dauliach ................................. | 219/411 |
| 5,937,686 | 8/1999 | Arai ......................................... | 72/150 |

FOREIGN PATENT DOCUMENTS

| | | |
|---|---|---|
| 2345278 | 10/1977 | France . |
| 1131869 | 6/1962 | Germany . |
| 1166451 | 3/1964 | Germany . |
| 29115773 | 10/1980 | Germany . |
| 553046 | 8/1974 | Switzerland . |

OTHER PUBLICATIONS

Patent Abstracts of Japan, vol. 013, No. 320 (M–853), Jul. 20, 1989 entitled, "Process of Bending of Synthetic Resin Tube" (JP 01 108020A, Apr. 25, 1989).

Primary Examiner—Teresa Walberg
Assistant Examiner—Daniel Robinson
Attorney, Agent, or Firm—Watson Cole Grindle Watson, P.L.L.C.

[57] ABSTRACT

The invention concerns a device for heating plastics profile sections, in particular for heating PVC profile sections (35), the device comprising a box for holding the profile section. Said box has a support plate (3), side panels and a lid, as well as means for feeding hot air to one end face of the profile section (35) so that it can flow internally and externally past the profile section. Efficient operation is attained in that a return duct (21, 22, 23) is provided for returning and reheating the air when it has flowed through or around the profile section (35) in order to form a closed air circuit.

13 Claims, 3 Drawing Sheets

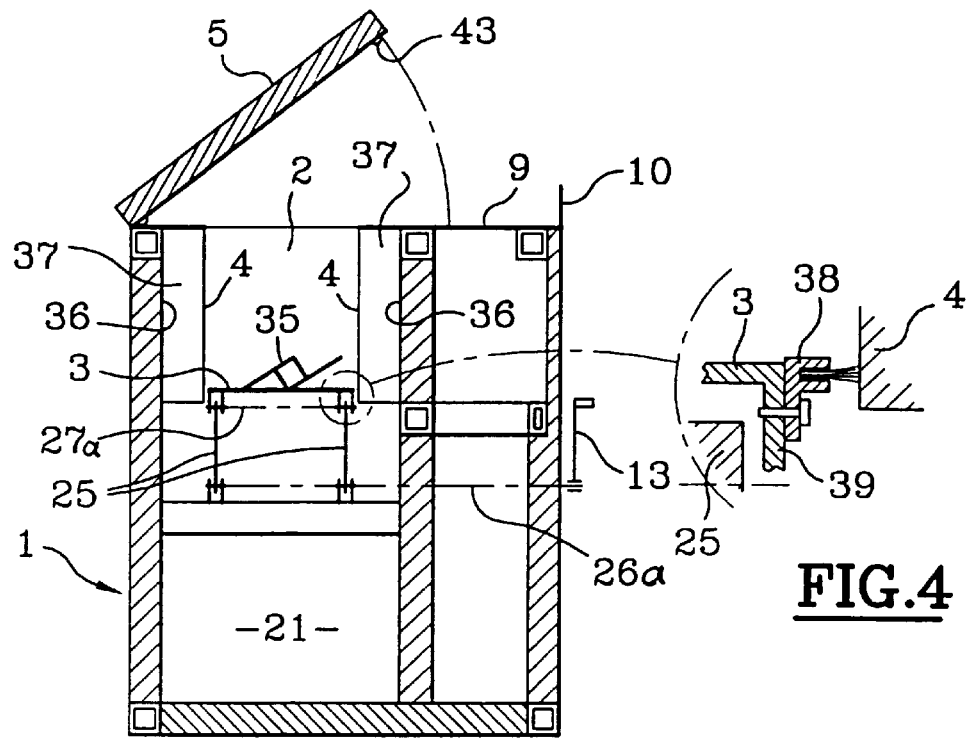
FIG.3
FIG.4
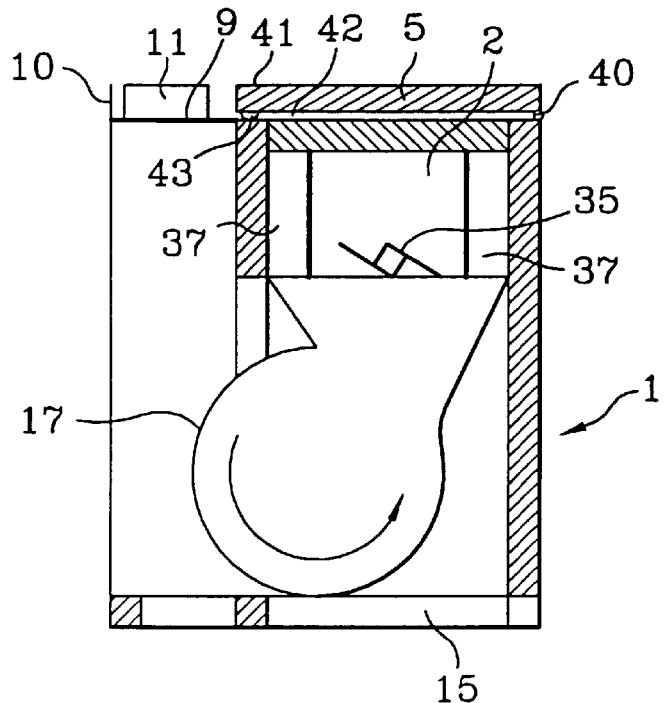
FIG.5

DEVICE FOR HEATING PLASTICS SECTIONS

BACKGROUND OF THE INVENTION

1. Field of the Invention

This invention relates to a device for heating plastics sections, in particular sections made of PVC, the device including a cabinet to accommodate a section, which cabinet has a supporting plate, side walls and a cover, as well as means for introducing hot air at one end of the section, so that it can flow past on the inside and outside of the section.

2. The Prior Art

Plastics sections are usually made by extrusion of PVC material. Certain applications require bending of the sections in order to obtain round forms, etc. Such processes are frequently employed in making doors and windows. The change in shape is achieved upon heating the section to a suitable temperature. For this purpose an oil bath may be applied, in which the section is heated to about 125° C. Although the devices known in this context will permit rapid heating, considerable effort and expense is required for the subsequent cleaning work, when the oil has to be removed from the section. For this reason devices of this type are avoided if possible.

In DE-B 11 66 451 a device for heating plastics sections is described where hot air is blown into and passed along a section. Various air ducts and flow obstructions are utilized for preferred heating of special parts of the section. Such device is complex and demands a large input of energy.

U.S. Pat. No. 3,706,824 is concerned with a device for heating and bending lengths of pipe. In that case heating elements are introduced into the pipe in order to heat the pipe from inside. Such devices are not suitable for parts with more intricate cross-sections.

It is an object of this invention to overcome the above problems and to propose a device which will ensure rapid and efficient heating accompanied by simplicity of design and low cost.

SUMMARY OF THE INVENTION

According to the invention this is achieved by providing a return duct for recirculating and reheating the air after it has passed through the section, in order to form a closed air circuit. The configuration proposed by the invention will offer a compact design where heat losses are largely eliminated and very little energy is required.

It is provided in a preferred embodiment that the return duct, a heating element and preferably a fan be arranged in the cabinet, i.e., below the supporting plate. This will result in a particularly compact design of the device.

Operation of the device, i.e., especially insertion and removal of the sections to be heated, may be simplified by designing the supporting plate so as to be liftable.

In a preferred variant the cabinet is provided on its upper side with an upwardly opening cover and a working surface. In this way the bending operation may be performed on the device itself as soon as the section has been lifted.

The invention further relates to a process for heating plastics sections, preferably sections made of PVC, where hot air is passed in longitudinal direction along the inside and outside of a section. The principal feature of this process is that the air is conducted in a closed loop.

BRIEF DESCRIPTION OF THE DRAWINGS

The invention will now be described further, with reference to the accompanying drawings illustrating embodiments thereof, in which FIG. 3 is a section along line 3—3 in FIG. 2, FIG. 4 shows a detail of FIG. 3, FIG. 5 is a section along line 5—5 in FIG. 2.

DETAILED DESCRIPTION OF THE PREFERRED EMBODIMENT

The device includes an elongated cabinet 1 which is designed to accommodate a plastics section 35 ready for heating. To permit accommodation of the different lengths of the sections to be heated, the cabinet 1 may have a length of 4 m or more.

Figure 1:
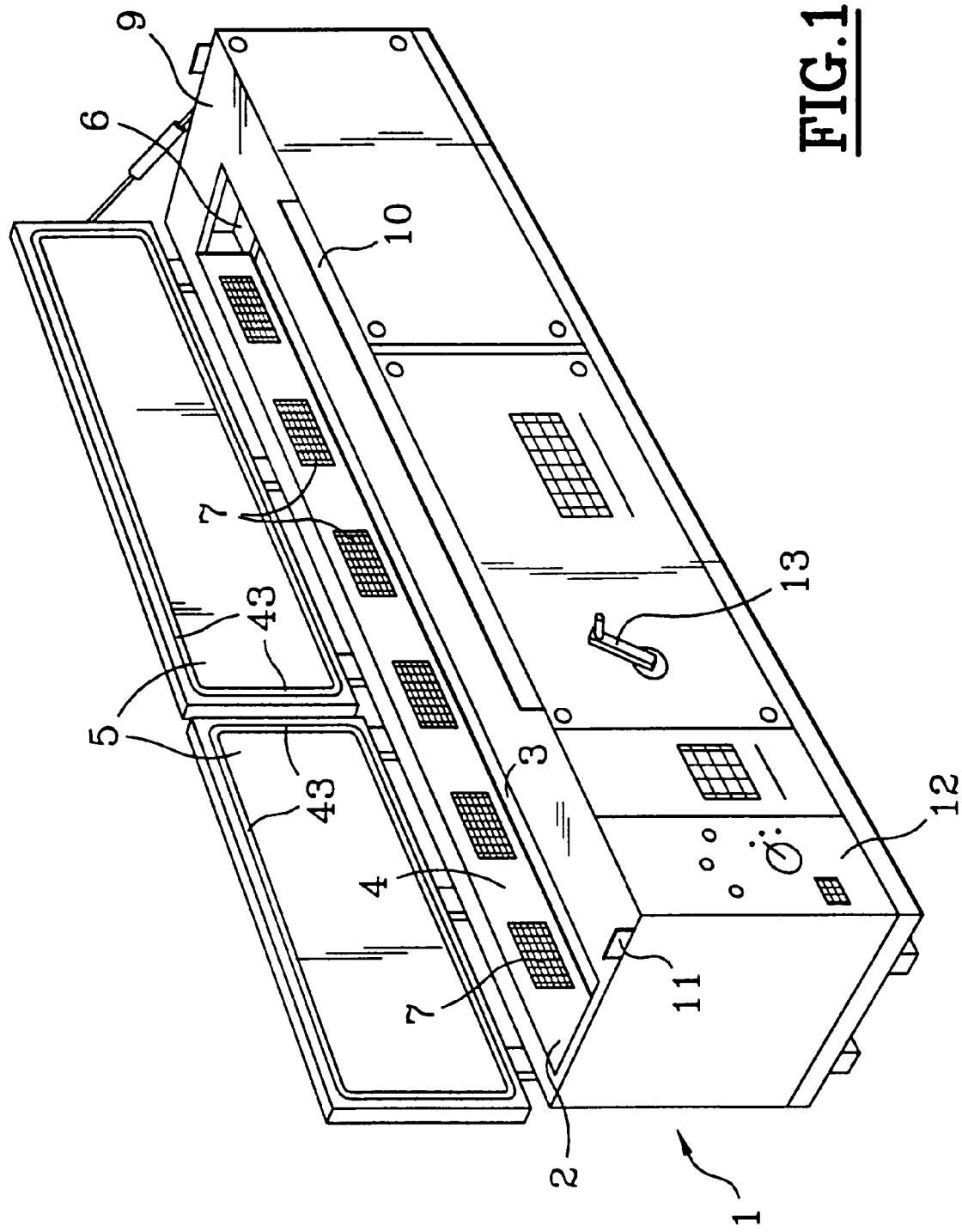
FIG. 1 is an axonometric general view of the device proposed by the invention.

The cabinet 1 essentially is a parallelepiped and encloses a heating compartment 2 which is closed off at the bottom by a supporting plate 3 on which the sections 35 to be heated are placed. On the upper side the cabinet 1 is closed by a hinged cover 5 which can be opened in two parts, as is shown in FIG. 1. Laterally, the heating compartment 2 is bounded by side walls 4.

On one of its short ends the heating compartment 2 features an opening 6 for introducing a stream of hot air, which is expelled through another opening on the opposite end after having passed the section 35.

As is also shown in FIG. 1, the side walls 4 are provided with openings or grids 7 permitting a lateral flow of hot air to act on the sides of the section 35 to be heated.

The supporting plate 3 is movable in vertical direction in order to facilitate insertion and removal of a section 35. On the upper side of the cabinet 1 is provided a working surface 9 which forms part of the top of the cabinet 1. As a measure of safety, the working surface 9 is bounded towards the front by a projecting strip 10. Another projection 11 on the short end of the device is employed to hold the sections 35 upon heating, for greater ease of operation.

To prevent the heated sections 35 on the working surface 9 from cooling down too quickly, the working surface 9 may be heated by a flow of hot air, which passes between the cover 5 and the working surface 9.

On the front face of cabinet 1 display and control elements are provided on a control panel 12. A crank 13 is provided for lifting or lowering the supporting plate 3. As is seen from the longitudinal section of FIG. 2, the cabinet 1 is insulated towards the outside. A bottom plate 15 is mounted on rollers 16. On the bottom plate 15 a fan 17 is positioned next to a short end of cabinet 1, which fan 17 is dimensioned so as to blow air through the cabinet 1 at a rate of 20–30 m/sec.

In a heating element 18, which also is mounted on bottom plate 15, a plurality of electric resistors 19 are provided. For example, twelve resistors are used, each rated at 1 kW.

Upstream of resistors 19 is provided a metal filter 20 to eliminate any contaminations of the air. The air circuit is closed by collecting the air in a rigid return duct 21 once it has flown past the section 35, and feeding it to the filter 20 through a flexible tube 22. Another flexible tube 23 will take the air from the heating element 18 to the fan 17.

Figure 2:
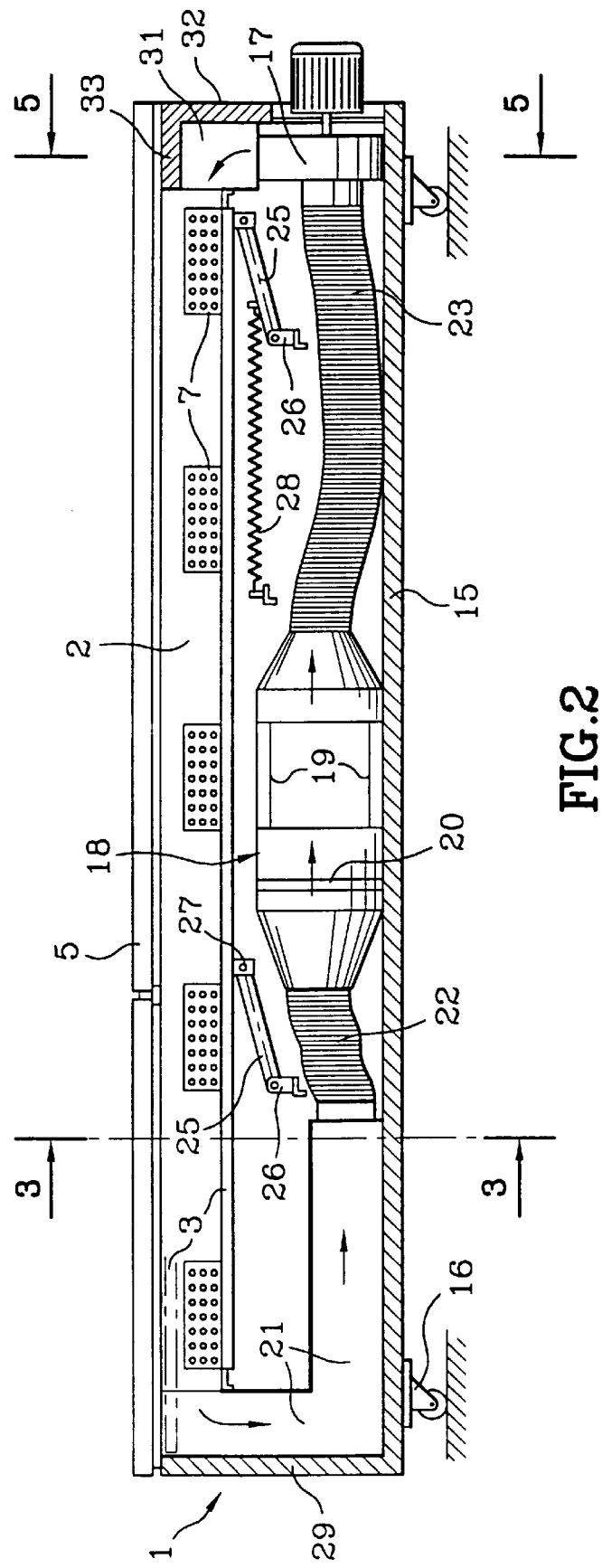
FIG. 2 is a longitudinal section through the device.

The supporting plate 3 on which the sections 35 are placed for heating, is movable in vertical direction. In FIG. 2 it is presented in its lowered position, which is the standard position assumed during the heating process. The supporting plate 3 forms the lower side of the heating compartment 2. It is borne by levers 25, which are supported on cabinet 1 on one end via bearings 26. On the other end of the levers 25 are provided bearings 27, which will connect the levers 25 with the supporting plate 3. By a swivel in a counter clockwise direction (FIG. 2) the supporting plate 3 is lifted. A spring 28 will preload the levers 25 in this direction. Levers 25 will provide a parallelogram linkage for the supporting plate 3. The axes 26a of bearings 26 and the axes 27a of bearings 27 are horizontal and parallel to each other. Via a gear train not shown here the crank 13 is linked with the levers 25 to permit swivelling. As an alternative, the lever mechanism could be driven by a motor.

In its lifted position a front end of the supporting plate 3 is contiguous with the front wall 29 on a short end of cabinet 1, as is indicated in FIG. 2 by broken lines. In this way the cabinet 1 is closed off on top even if covers 5 are open, which will prevent any losses due to the escape of hot air. In the lifted position the top of the supporting plate 3 is flush with the working surface 9, such that the sections 35 can be handled easily.

Above the fan 17 is provided a baffle box 31 for the hot air, which is formed by a front wall 32 and a top wall 33. Walls 32 and 33 are thermally insulated.

FIG. 3 presents a sectional view of cabinet 1 with the supporting plate 3 lowered, whilst cover 5 is shown in open position. As is seen, the heating compartment 2 is laterally bounded by side walls 4. The heating compartment 2 may have a cross-section of about 200 mm by 200 mm. Between the side walls 4 and the insulated walls 36 of cabinet 1 flow passages 37 are provided to deliver hot air to the grids 7. These flow passages 37 may have a cross-section of 200 mm by 50 mm.

FIG. 4 is a view of a detail from FIG. 3. As is seen, the sides of supporting plate 3 are provided with gaskets 38 which are mounted on a flange 39. Gaskets 38 serve to prevent the escape of hot air between supporting plate 3 and side wall 4.

FIG. 5 shows a cross-section through cabinet 1 at one of its short ends, cover 5 being closed. The cover 5 is pivoted on a hinge 40. At the side 41 opposite of hinge 40 a seal 43 is provided on the lower side of the cover 5, which will seal the cover 5 against the working surface 9. Because of the thickness of the seal 43 a gap 42 is formed between the cover 5 and the working surface 9, which is swept by a flow of hot air. This will supply the working surface 9 with additional heat as the hot air will spread over the entire width of the working surface 9.

The hot air flow inside the heating compartment 2 is applied at high speed, the specific working cycle employed depending on the type of section 35 to be heated.

The working cycle will take several minutes. At the beginning of the cycle the temperature is raised to a level of 5% to 15% above normal heating temperature. During normal heating of the sections 35, seventy-five percent of electrical resistors 19 are employed, whilst all of resistors 19 are utilized at the beginning of the cycle.

Under normal heating conditions the air temperature will be 150° C., for example.

Means for heating the air are electrical resistors or other suitable devices.

What is claimed is:

1. Device for heating plastic sections, comprising a cabinet to accommodate a section, said cabinet including a supporting plate, side walls and a cover, means for introducing hot air at one end of the section so that it can flow past on the inside and outside of the section, a return duct below the supporting plate for the purpose of recirculating and reheating the air after it has passed the section on the inside and outside, forming a closed air circuit, said return duct being connected on two short ends of the cabinet with the space above the supporting plate, and means to move said supporting plate between an upper position where a plastic section can be positioned thereon or removed therefrom and a lower position within the cabinet where a plastic section located thereon can be heated in said space defined thereabove.

2. Device as claimed in claim 1, including a heating element in the cabinet below the supporting plate.

3. Device as claimed in claim 1, including a heating element and a fan in the cabinet below the supporting plate.

4. Device as claimed in claim 1, wherein the supporting plate in its upper position will essentially seal the cabinet towards the top.

5. Device as claimed in claim 1, wherein the cabinet is provided on its upper side with an upwardly opening cover and a working surface.

6. Device as claimed in claim 5, wherein when in said upper position the supporting plate is in a common plane with the working surface.

7. Device as claimed in claim 1, wherein the side walls of the cabinet include discharge openings directing hot air onto the section.

8. Device as claimed in claim 2, wherein the heating element comprises electric resistors.

9. Device as claimed in claim 1, including a metal filter in the cabinet to clean the recirculated air.

10. Device as claimed in claim 1, including a fan which is dimensioned so as to move air through the cabinet at an average rate of 20 to 30 m/sec.

11. Device as claimed in claim 1, wherein means are provided for conducting a hot air stream along the working surface in order to heat said working surface.

12. Process for heating plastic sections in an apparatus which comprises a cabinet including side walls and a cover and which contains a supporting plate for a plastic section, said supporting plate being movable between an upper position where a plastic section can be positioned thereon or removed therefrom and a lower position within the cabinet where a plastic section located thereon can be heated in the space defined thereabove, and a return duct located beneath the supporting plate for recirculating air from the space at a downstream end of the cabinet to an upstream end, the process including the steps of (a) positioning a plastic section in said space above the supporting plate when at said upper position, (b) lowering said supporting plate with plastic section thereon to said lower position, (c) passing hot air in a heating cycle through said space from said upstream end to said downstream end of said cabinet so as to contact and heat said plastic section, said hot air at a start of said heating cycle being 5 to 150° hotter than during a later time in said heating cycle, and (d) recirculating said hot air through said return duct.

13. Process according to claim 12, wherein a temperature of said hot air during said later time in said heating cycle is about 150° C.

* * * * *

UNITED STATES PATENT AND TRADEMARK OFFICE
CERTIFICATE OF CORRECTION

PATENT NO. : 6,097,002
DATED : August 1, 2000
INVENTOR(S) : Pierre Hugnet

It is certified that error appears in the above-identified patent and that said Letters Patent is hereby corrected as shown below:

Title page,
[30] Foreign Application Priority Data
May 3, 1996 [FR] France ......................................96 05757

Signed and Sealed this

Fourteenth Day of August, 2001

Attest:

*Attesting Officer*

NICHOLAS P. GODICI
*Acting Director of the United States Patent and Trademark Office*

UNITED STATES PATENT AND TRADEMARK OFFICE
CERTIFICATE OF CORRECTION

PATENT NO. : 6,097,002  
DATED : August 1, 2000  
INVENTOR(S) : Pierre Huguet

Page 1 of 1

It is certified that error appears in the above-identified patent and that said Letters Patent is hereby corrected as shown below:

Title page,
Item [30], Foreign Application Priority Data
May 3, 1996 [FR] France ..............................................96 05757

This certificate supersedes Certificate of Correction issued August 14, 2001.

Signed and Sealed this

Eighteenth Day of December, 2001

*Attest:*

*Attesting Officer*

JAMES E. ROGAN
*Director of the United States Patent and Trademark Office*